US012686027B2

(12) United States Patent
Yu et al.

(10) Patent No.: US 12,686,027 B2
(45) Date of Patent: Jul. 21, 2026

(54) ROTARY SPRINKLER HEAD AND SPRAYING DEVICE

(71) Applicant: AQUALEAN MANUFACTURING ASSOCIATES CO., LTD., Taipei City (TW)

(72) Inventors: Pin-Hsien Yu, Taipei City (TW); Kai-Yuan Chen, Taipei City (TW)

( * ) Notice: Subject to any disclaimer, the term of this patent is extended or adjusted under 35 U.S.C. 154(b) by 158 days.

(21) Appl. No.: 18/772,518

(22) Filed: Jul. 15, 2024

(65) Prior Publication Data

US 2026/0014580 A1 Jan. 15, 2026

(51) Int. Cl.
*B05B 15/74* (2018.01)
*B05B 1/16* (2006.01)
*B05B 3/04* (2006.01)

(52) U.S. Cl.
CPC ................ *B05B 15/74* (2018.02); *B05B 1/16* (2013.01); *B05B 3/04* (2013.01)

(58) Field of Classification Search
CPC ....... B05B 3/043; B05B 3/008; B05B 3/0429; B05B 3/04; B05B 1/16; B05B 15/74
See application file for complete search history.

(56) References Cited

U.S. PATENT DOCUMENTS 3,082,957 A * 3/1963 Semple ................... B05B 3/008 239/206
3,091,398 A * 5/1963 Hruby, Jr. ............... B05B 3/008 239/206
4,989,786 A * 2/1991 Kranzle .................. B05B 3/043 239/263
6,129,293 A * 10/2000 Jager ....................... B05B 3/043 239/391
6,155,494 A * 12/2000 Fabbri ..................... B05B 3/043 239/240
6,676,037 B2 * 1/2004 Marks ..................... B05B 3/043 239/263
7,118,051 B1 * 10/2006 Jager ....................... B05B 3/043 239/251
7,635,096 B2 * 12/2009 Wright .................... B05B 3/002 134/198
10,478,838 B2 * 11/2019 Lin ....................... B05B 1/3457
11,931,760 B2 * 3/2024 Wang .................... B05B 7/0483
2008/0164343 A1 * 7/2008 Jager ....................... B05B 3/043 239/243

(Continued)

*Primary Examiner* — Joseph A Greenlund
(74) *Attorney, Agent, or Firm* — EGBERT, MCDANIEL & SWARTZ, PLLC

(57) ABSTRACT

Disclosed is a rotary sprinkler head and a spraying device including the same. The rotary sprinkler head has a shell-shaped main body, a rotating body, and a limiting member. The interior of the main body forms a chamber which accommodates the rotating body and is delimited by the limiting member. A water outlet passage is connected to the chamber through one end of the main body. The rotating body features an abutting segment, and a flow guiding passage extends through the abutting segment to connect with the water outlet passage. This flow guiding passage is obliquely oriented relative to the axis of the chamber, thereby allowing the water to enter a second space, then divide into flows through a first space and the flow guiding passage, causing the rotating body to rotate about its own axis and perform a vortex-like circular motion.

7 Claims, 11 Drawing Sheets

01

(56) References Cited

U.S. PATENT DOCUMENTS

| | | | | |
|---|---|---|---|---|
| 2008/0265058 | A1* | 10/2008 | Wimmer | B05B 3/043 239/258 |
| 2012/0138706 | A1* | 6/2012 | Wesch | B05B 3/043 239/214 |
| 2016/0228888 | A1* | 8/2016 | Ferrarini | B05B 1/3006 |
| 2016/0339458 | A1* | 11/2016 | Fu | B05B 7/064 |
| 2017/0361341 | A1* | 12/2017 | Dirnberger | B05B 1/02 |
| 2018/0345303 | A1* | 12/2018 | Jäger | B05B 15/18 |
| 2021/0245181 | A1* | 8/2021 | Lo | B05B 3/0426 |
| 2025/0099987 | A1* | 3/2025 | Taylor | B05B 3/0429 |
| 2025/0178349 | A1* | 6/2025 | Tanaka | B41J 2/16511 |
| 2026/0014580 | A1* | 1/2026 | Yu | B05B 15/74 |

* cited by examiner

ROTARY SPRINKLER HEAD AND SPRAYING DEVICE

CROSS-REFERENCE TO RELATED APPLICATIONS

Not applicable.

BACKGROUND OF THE INVENTION

The present invention relates to a sprinkler head. More particularly, it relates to a rotary sprinkler head and a spraying device.

Conventional sprinklers include a shell-shaped main body with an internal flow path. One end of this flow path extends to the end of the main body for connecting to a water supply pipe, while the other end extends to the front of the main body. A control valve is incorporated into the main body to regulate the open or closed status of the flow path, allowing water from the supply pipe to enter the flow path and be sprayed forward through it.

Some conventional sprinklers have a rotatable drain valve at the front end that forms multiple water outlet modules. Each module contains one or more water outlet holes, with varying shapes and diameters as required. Users can rotate the drain valve to align a desired water outlet module with the flow path, thereby altering the shape and range of the sprayed water jet, with the outwardly sprayed water jet traveling in a straight path.

SUMMARY OF THE INVENTION

The main purpose of the present invention is to provide a rotary sprinkler head and a spraying device equipped with said rotary sprinkler head.

To achieve the purpose above, the present invention adopts the following technical solution:

A rotary sprinkler head, comprising a shell-shaped main body, a rotating body, and a limiting member. Wherein the interior of the main body forms a chamber in which the rotating body is accommodated. One axial end of the main body is designated as the water inlet end, and the opposite axial end is designated as the water outlet end. A virtual first axis line runs along the axis of the chamber, extending from the water inlet end to the water outlet end. The limiting member is positioned at the water inlet end and delimits the rotating body within the chamber. The chamber includes an annular first space and a second space, the first space extends to connect with the second space and surrounds the radial outer periphery of the rotating body, while the second space is situated between the rotating body and the limiting member.

The main body features multiple positioning stops spaced apart from each other and connected to the water outlet end. A water outlet passage extends through the side of each positioning stop facing the direction of the first axis line. One end of the water outlet passage is connected to the chamber, and the other end extends to the water outlet end. Multiple discharge passages are formed between adjacent positioning stops. Each discharge channel connects the water outlet passage and the first space, and each discharge channel extends to the water outlet end. The main body forms a conical surface surrounding the chamber in an annular manner, the first axis line passes through the circular center of the conical surface, and the diameter of the conical surface decreases along the first axis line from the water inlet end toward the water outlet end.

The rotating body forms an abutting segment and a convergent segment along its axis, where one end of the abutting segment abuts each positioning stop, and the convergent segment is adjacent to the end of the rotating body remote from the abutting segment. The radial outer periphery of the convergent segment is conical, and its outer diameter increases along the axis of the rotating body from the end of the convergent segment adjacent to the abutting segment toward the other end. The convergent segment and the conical surface are radially opposed. A flow guiding passage extends through the abutting segment to connect with the water outlet passage, a virtual second axis line is defined passing through the radial center of the flow guiding passage, and the second axis line obliquely intersects the first axis line. A conical flow converging passage penetrates the interior of the convergent segment along its axis to connect the flow guiding passage and the second space, and the inner diameter of the flow converging passage increases from the end near the flow guiding passage to the other end.

The limiting member is axially penetrated by a water inlet port, which is connected to the second space, allowing water to enter the second space through the water inlet port and then flow through the first space and the flow guiding passage, thereby causing the rotating body to rotate about its own axis and perform a vortex-like circular motion with the first axis line as the center.

A spraying device, comprising a shell body and the rotary sprinkler head as claimed in claim 1, wherein the rotary sprinkler head is placed inside the shell body, and the water outlet passage is connected to the exterior of the shell body. The interior of the shell body forms a flow path, one end of the flow path is used to connect to a water supply pipe, and the other end of the flow path is connected to the water inlet port.

The main effect and advantage of the present invention is that when water flows through the rotating body and the chamber to spray outward, the rotating body not only rotates on its own axis but also performs a vortex-like circular motion with the first axis line as the center, forming a motion similar to a revolution.

DETAILED DESCRIPTION OF THE INVENTION

Figure 1:
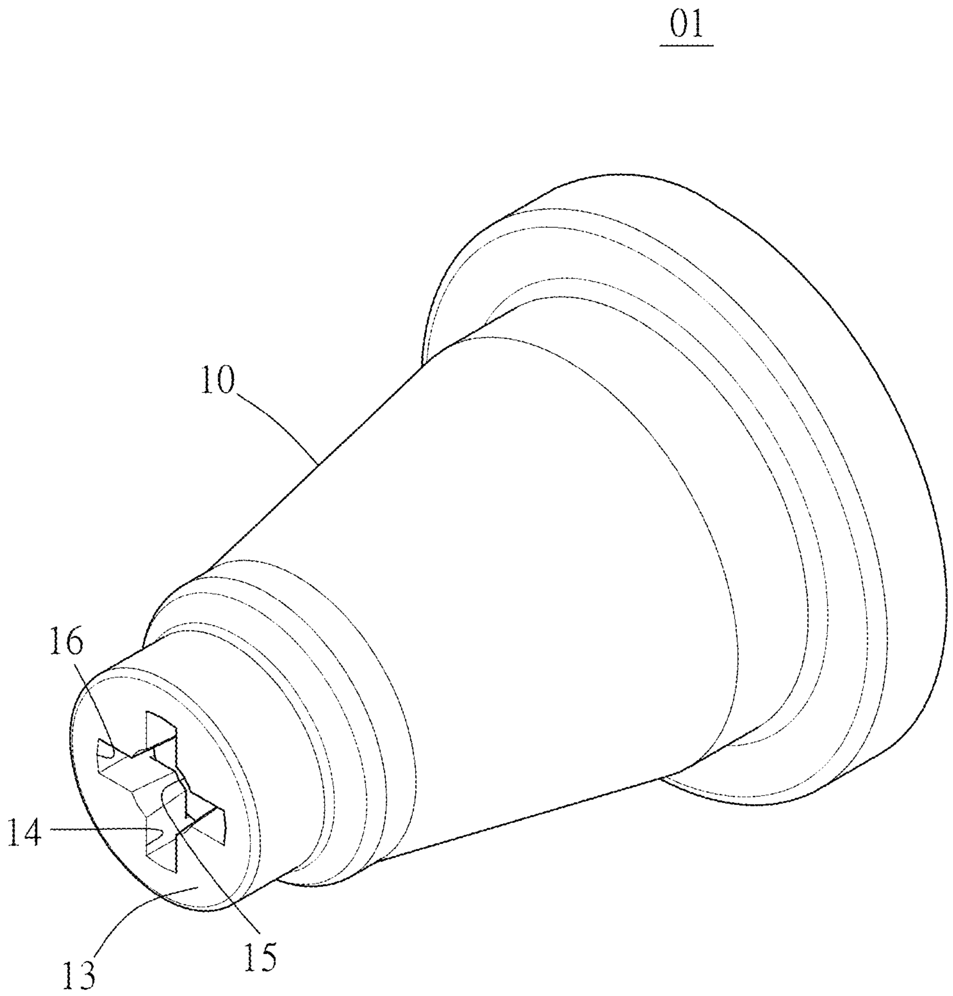
FIG. 1 is a perspective view of the first embodiment of the rotary sprinkler head of the present invention.
Figure 2:
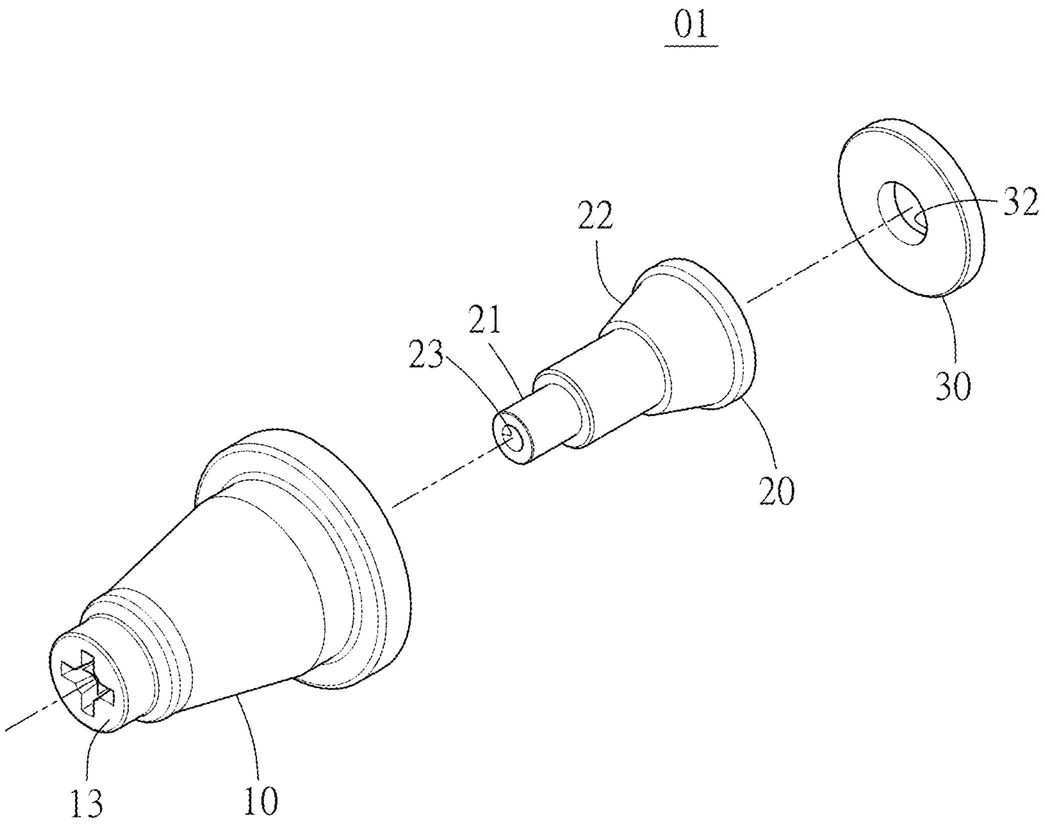
FIG. 2 is an exploded perspective view of the first embodiment of the rotary sprinkler head of the present invention.
Figure 3:
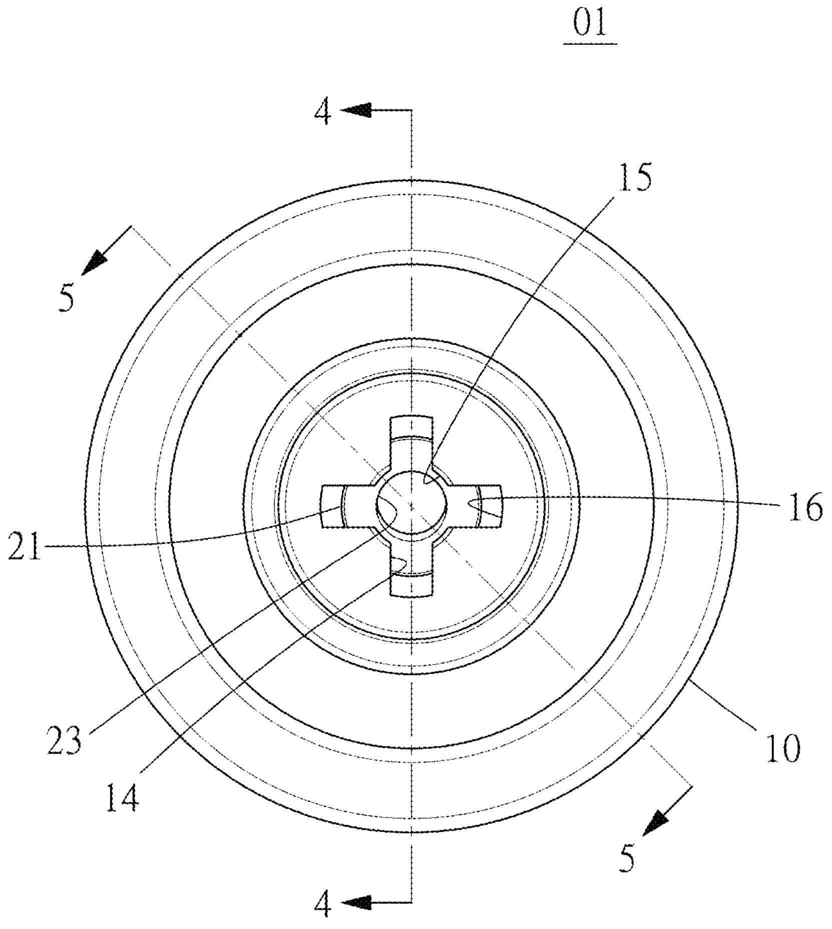
FIG. 3 is a front view of the first embodiment of the rotary sprinkler head of the present invention.
Figure 4:
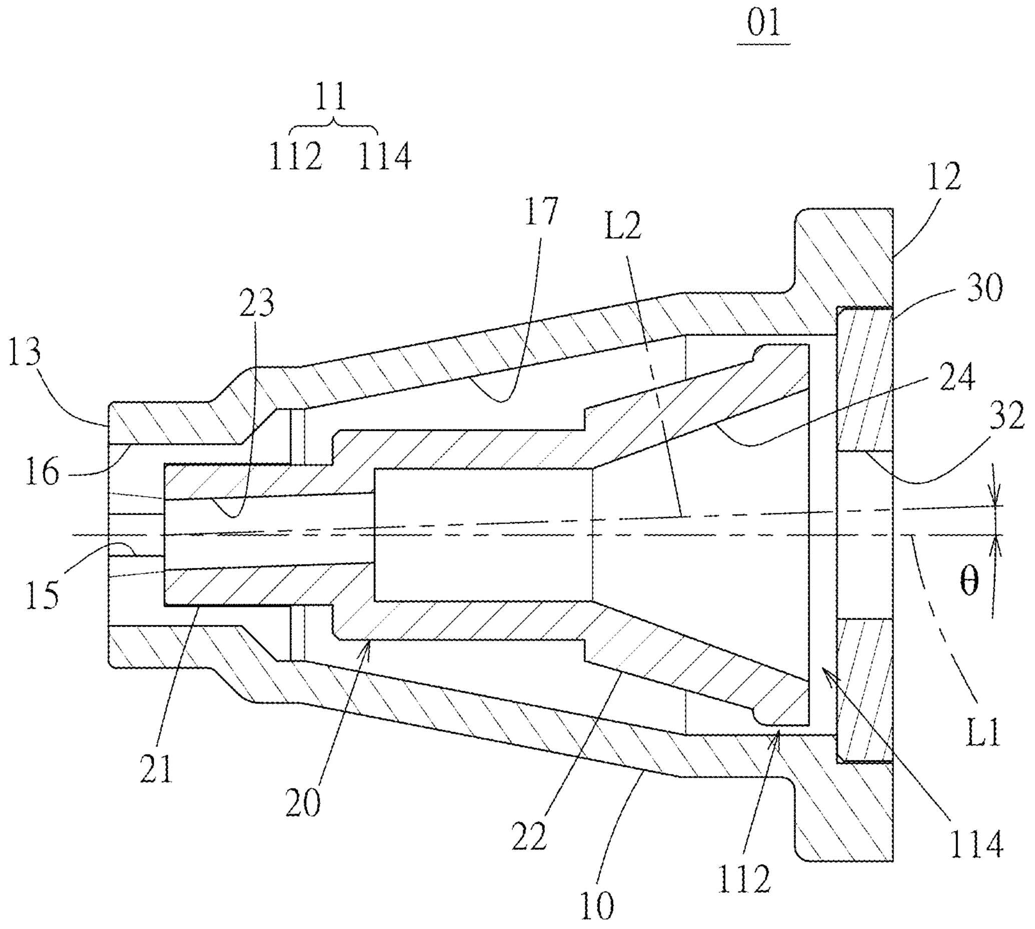
FIG. 4 is a line 4-4 sectional view of FIG. 3.
Figure 5:
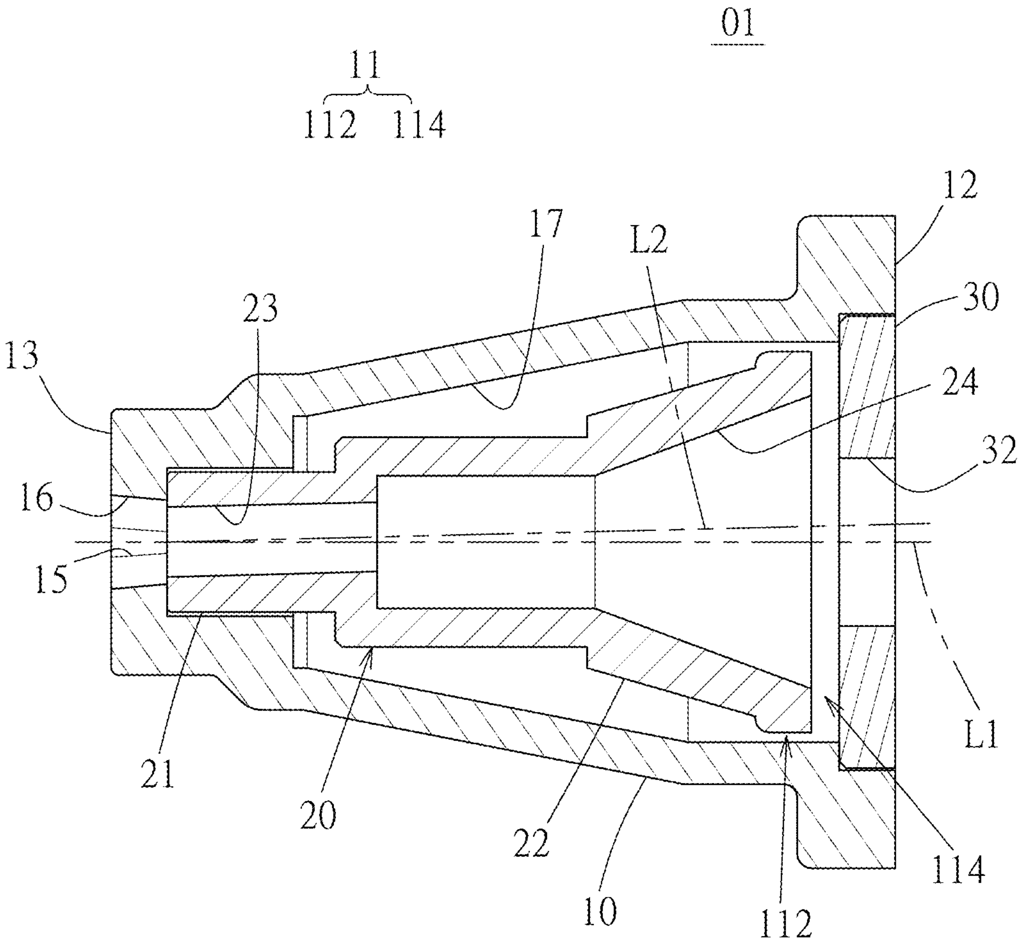
FIG. 5 is a line 5-5 sectional view of FIG. 3.
Figure 6:
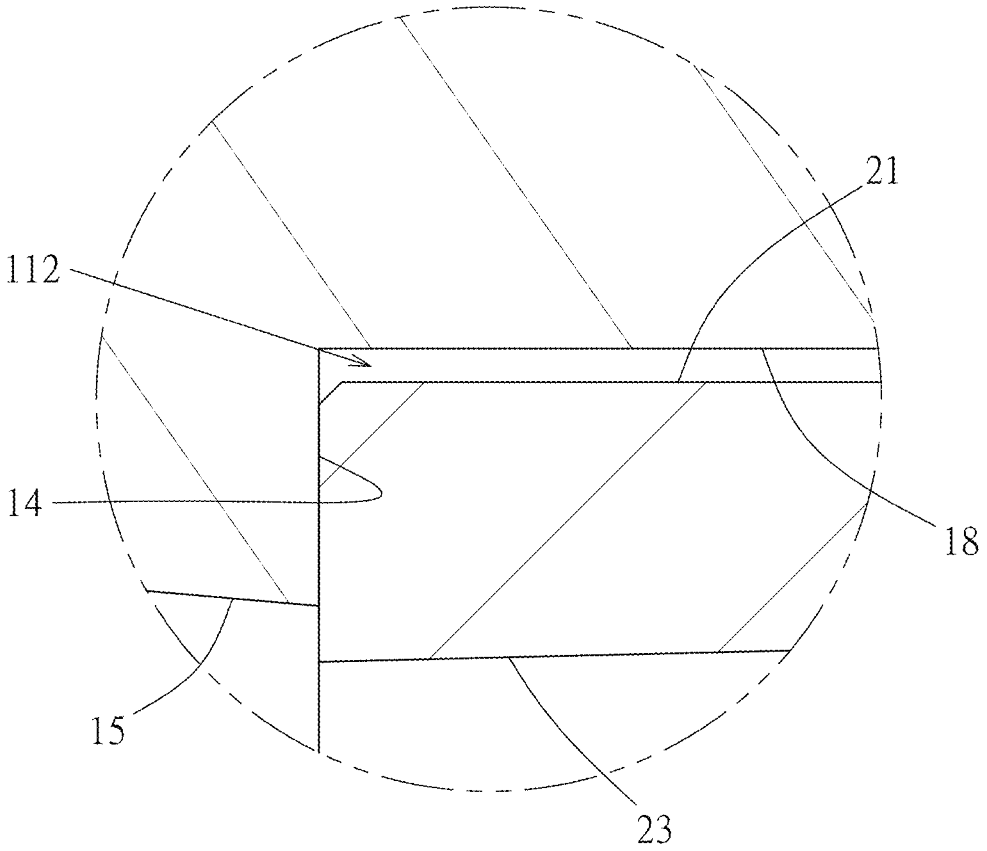
FIG. 6 is a partial enlarged view of FIG. 5.

The drawings shown are embodiments of the present invention, but these embodiments are for illustrative purposes only and do not limit the structure in the patent application.

As shown in FIGS. 1 to 6, the rotary sprinkler head 01 of the present invention comprises a shell-shaped main body 10, a rotating body 20, and a limiting member 30. The interior of the main body 10 forms a chamber 11 in which the rotating body 20 is accommodated. One axial end of the main body 10 is designated as the water inlet end 12, and the opposite axial end is designated as the water outlet end 13. A virtual first axis line L1 runs along the axis of the chamber 11, extending from the water inlet end 12 to the water outlet end 13. The limiting member 30 is positioned at the water inlet end 12 and delimits the rotating body 20 within the chamber 11. The chamber 11 includes an annular first space 112 and a second space 114. The first space 112 extends to connect with the second space 114 and surrounds the radial outer periphery of the rotating body 20, while the second space 114 is situated between the rotating body 20 and the limiting member 30.

The main body 10 features multiple positioning stops 14 spaced apart from each other and connected to the water outlet end 13. A water outlet passage 15 extends through the side of each positioning stop 14 facing the direction of the first axis line L1. One end of the water outlet passage 15 is connected to the chamber 11, and the other end extends to the water outlet end 13. Multiple discharge passages 16 are formed between adjacent positioning stops 14. Each discharge channel 16 connects the water outlet passage 15 and the first space 112, and each discharge channel 16 extends to the water outlet end 13. The main body 10 forms a conical surface 17 surrounding the chamber 11 in an annular manner. The first axis line L1 passes through the circular center of the conical surface 17, and the diameter of the conical surface 17 decreases along the first axis line L1 from the water inlet end 12 toward the water outlet end 13.

The rotating body 20 forms an abutting segment 21 and a convergent segment 22 along its axis. One end of the abutting segment 21 abuts each positioning stop 14. The convergent segment 22 is adjacent to the end of the rotating body 20 remote from the abutting segment 21. The radial outer periphery of the convergent segment 22 is conical, and its outer diameter increases along the axis of the rotating body 20 from the end of the convergent segment 22 adjacent to the abutting segment 21 toward the other end. The convergent segment 22 and the conical surface 17 are radially opposed. A flow guiding passage 23 extends through the abutting segment 21 to connect with the water outlet passage 15. A virtual second axis line L2 is defined passing through the radial center of the flow guiding passage 23, and the second axis line L2 obliquely intersects the first axis line L1, thereby making the axis of the flow guiding passage 23 oblique with respect to the axis of the chamber 11. Specifically, an angle θ is formed between the second axis line L2 and the first axis line L1. This angle θ is between 1° and 6°. In the first embodiment, the angle θ is illustrated as 2°. A conical flow converging passage 24 penetrates the interior of the convergent segment 22 along its axis to connect the flow guiding passage 23 and the second space 114. The inner diameter of the flow converging passage 24 increases from the end near the flow guiding passage 23 to the other end.

The limiting member 30 is axially penetrated by a water inlet port 32, which is connected to the second space 114. The inner diameter of the water inlet port 32 is equal to or smaller than the inner diameter of the flow converging passage 24 on the side closer to the water inlet port 32. Preferably, the inner diameter of the water inlet port 32 is smaller than the inner diameter of the flow converging passage 24 on the side closer to the water inlet port 32. This allows water to enter the second space 114 through the water inlet port 32 and then flow through the first space 112 and the flow guiding passage 23, thereby causing the rotating body 20 to rotate about its own axis and perform a vortex-like circular motion with the first axis line L1 as the center.

The water enters the second space 114 through the water inlet port 32, and is then divided into flows entering the flow converging passage 24 and the annular first space 112 surrounding the rotating body 20.

The water entering the rotating body 20 is guided by the conical flow converging passage 24, which concentrates the water flow toward the flow guiding passage 23 and increases the flow velocity of the water entering the flow converging passage 24. Then, the water is guided by the flow guiding passage 23 to flow in the direction of the second axis line L2, passing through the flow guiding passage 23 and the water outlet passage 15 to spray out of the rotary sprinkler head 01.

The water passing through the first space 112 is guided by the conical surface 17, concentrated toward the radial outer part of the rotating body 20, and flows toward the water outlet end 13, then sprays out of the rotary sprinkler head 01 through each discharge channel 16.

The first space 112 annularly surrounds the radial outer periphery of the rotating body 20, and the second space 114 is situated between the rotating body 20 and the limiting member 30, ensuring that the radial outer periphery of the rotating body 20 and its end facing the limiting member 30 are not restricted by the main body 10 and the limiting member 30, wherein the chamber 11 provides an adequate space for the rotating body 20 to move.

As the water flows through the first space 112 toward each discharge channel 16, the conical surface 17 directs the direction of the water flow. The water flow acts obliquely on the radially outer part of the rotating body 20. Combined with the oblique spatial configuration of the axis of the flow guiding passage 23 relative to the axis of the chamber 11, the increased velocity of the water flow passing through the flow guiding passage 23 and annularly surrounding on the rotating body 20 that defines and creates a biasing force within the flow guiding passage 23. As a result, the oblique force acting on the radially outer part of the rotating body 20 and the biasing force formed within the flow guiding passage 23 acting on the rotating body 20 cause the rotating body 20 not only to rotate about its own axis, but also to perform a vortex-like circular motion with the first axis line L1 as the center, thereby forming a motion similar to a revolution.

The axis of the flow guiding passage 23 continuously changes with the vortex-like circular motion of the rotating body 20, causing the water flow sprayed through the flow guiding passage 23 to travel in a path approximating a spiral shape toward the front of the rotary sprinkler head 01 while gradually dispersing laterally.

The cone angle of the radial outer periphery of the convergent segment 22 is greater than the cone angle of the conical surface 17, and the cone angle of the flow converging passage 24 is greater than the cone angle of the conical surface 17.

The main body 10 forms multiple surrounding blocks 18 annularly surrounding the radial outer part of the abutting segment 21, and each discharge channel 16 extends between two adjacent surrounding blocks 18. The first space 112 extends between each surrounding block 18 and the abutting segment 21, and is connected to each discharge channel 16.

When the rotating body 20 performs the vortex-like circular motion, the surrounding blocks 18 annularly surrounding the abutting segment 21 can limit the axial deflection angle of the rotating body 20 relative to the first axis line L1. The part of the flow guiding passage 23 at the end of the abutting segment 21 is restricted in the region of the water outlet passage 15 projected along the first axis line L1 toward the rotating body 20. This ensures that the water flow leaving the flow guiding passage 23 can completely enter the water outlet passage 15, preventing a portion of the water flow leaving the flow guiding passage 23 from hitting the positioning stops 14, which would affect the efficiency of the external water spraying.

Each surrounding block 18 is connected to the side of each positioning stop 14 facing the chamber 11.

Figure 7:
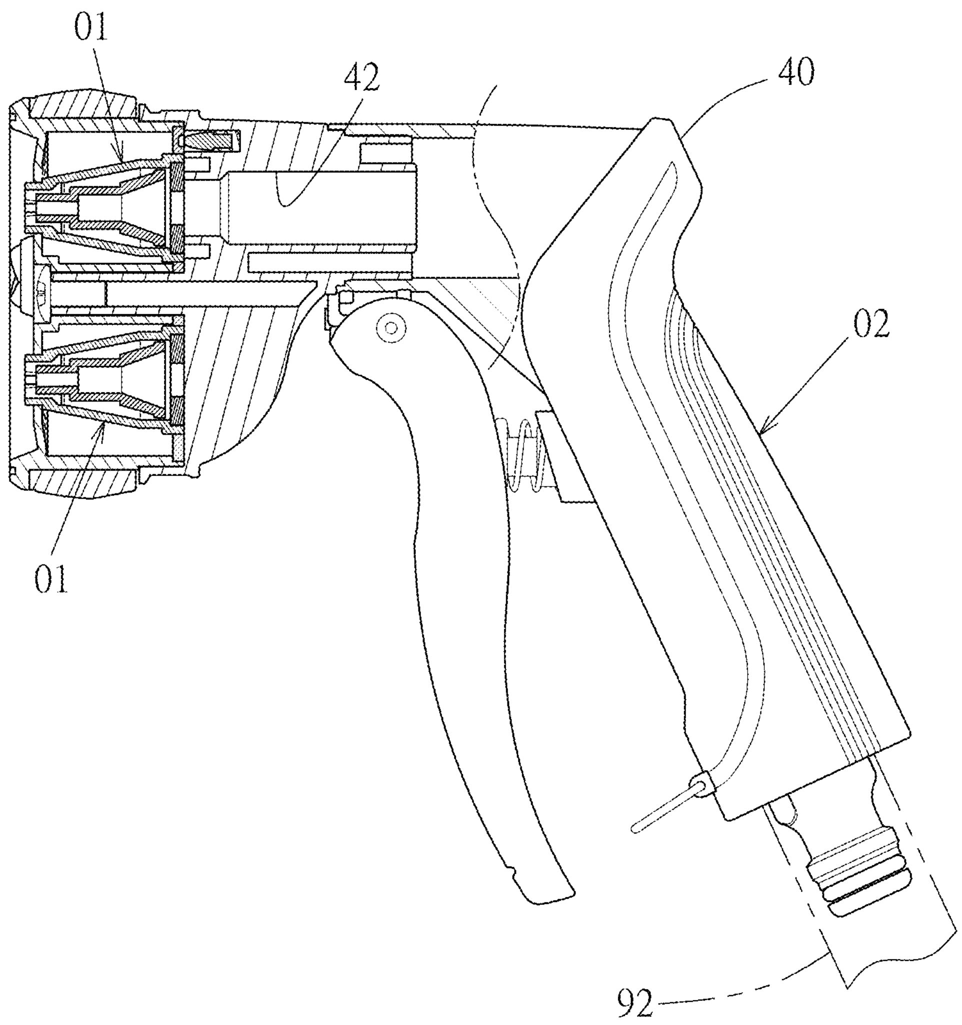
FIG. 7 is a sectional view of a spraying device with the first embodiment of the rotary sprinkler head of the present invention.

FIG. 7 illustrates a spraying device 02 with the rotary sprinkler head 01, and this spraying device 02 is a type of water gun. The spraying device 02 comprises a shell body 40 and the rotary sprinkler head 01. The rotary sprinkler head 01 is placed inside the shell body 40, and the water outlet passage 15 is connected to the exterior of the shell body 40. The interior of the shell body 40 forms a flow path 42. One end of the flow path 42 is used to connect to a water supply pipe 92, and the other end of the flow path 42 is connected to the water inlet port 32. The water supply pipe 92 is an external pipe that supplies water to the spraying device 02.

Figure 8:
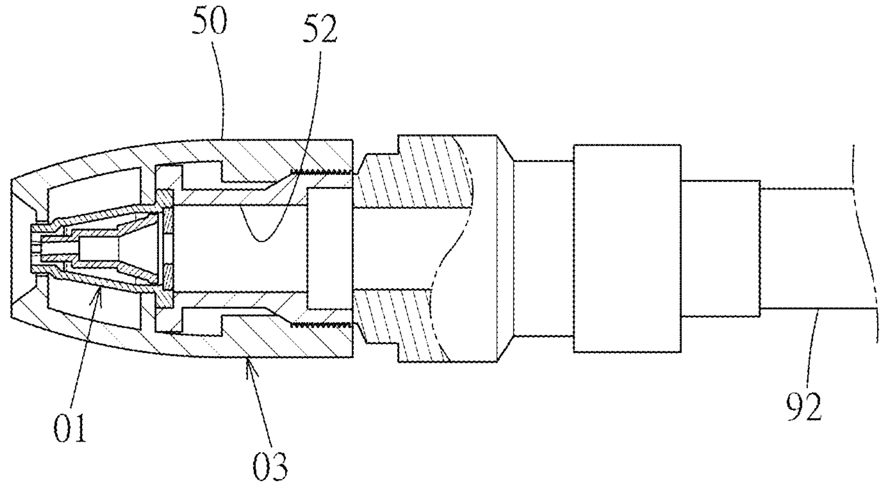
FIG. 8 is a sectional view of another spraying device with the first embodiment of the rotary sprinkler head of the present invention.

FIG. 8 illustrates another type of spraying device 03 with the rotary sprinkler head 01. This spraying device 03 is a type of elongated sprinkler, which may be, in particular, a nozzle. The spraying device 03 comprises an elongated shell body 50 and the rotary sprinkler head 01. The rotary sprinkler head 01 is placed inside the shell body 50, and the water outlet passage 15 is connected to the exterior of the shell body 50. The interior of the shell body 50 forms a flow path 52. One end of the flow path 52 is used to connect to the water supply pipe 92, and the other end of the flow path 52 is connected to the water inlet port 32.

Figure 9:
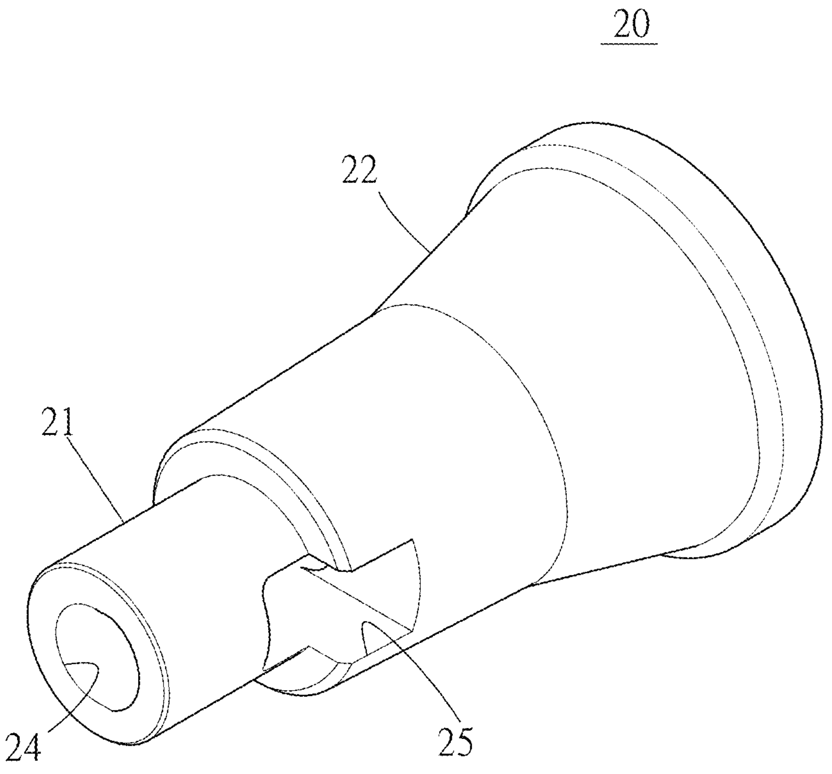
FIG. 9 is a perspective view of the rotating body of the second embodiment of the rotary sprinkler head of the present invention.
Figure 10:
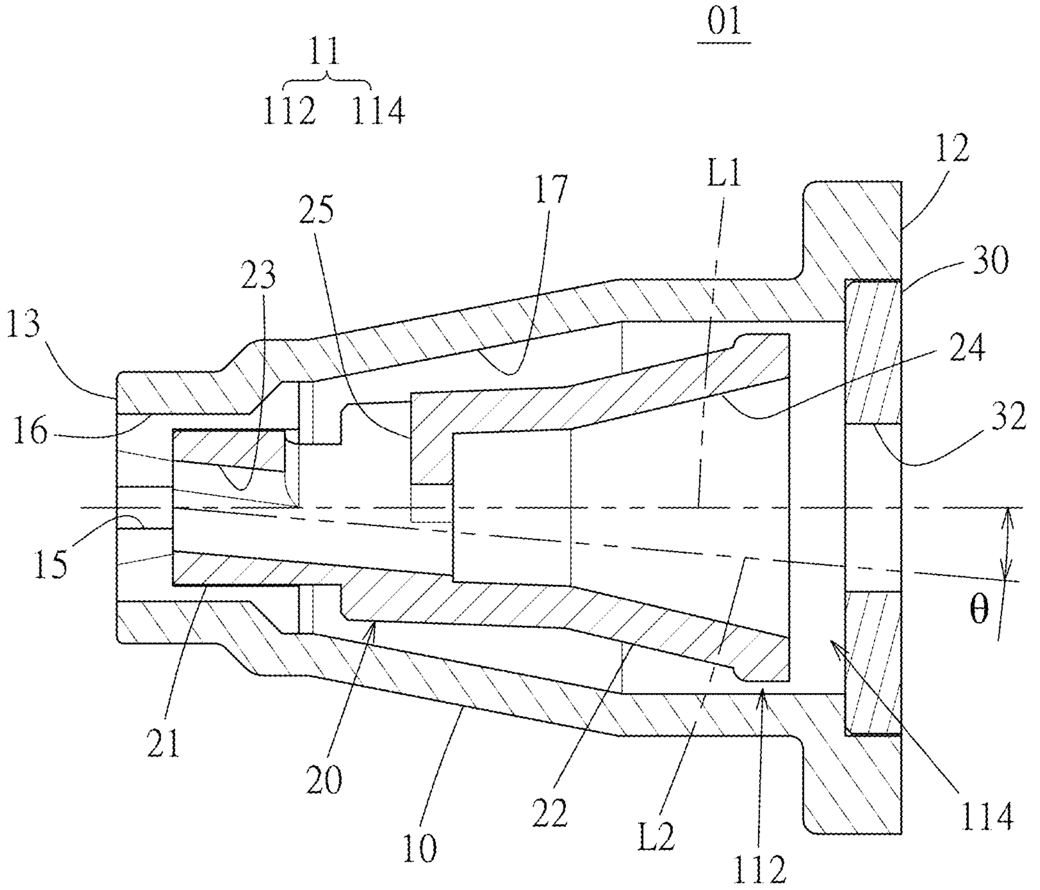
FIG. 10 is an axial sectional view of the second embodiment of the rotary sprinkler head of the present invention.

As shown in FIGS. 9 and 10, the second embodiment of the rotary sprinkler head 01 differs from the first embodiment mainly in that the angle θ formed between the second axis line L2 and the first axis line L1 is 5°. Thus, the axial deflection angle of the rotating body 20 relative to the first axis line L1 is increased when the rotating body 20 performs the vortex-like circular motion.

The rotating body 20 laterally forms a connecting passage 25 connecting the first space 112 and the flow guiding passage 23. A portion of the water flow passing through the first space 112 enters the flow guiding passage 23 through the connecting passage 25. As it turns to flow along the second axis line L2 toward the water outlet passage 15, it generates a force with a larger deflection angle on the rotating body 20. This increases the axial deflection angle of the rotating body 20 relative to the first axis line L1 as the rotating body 20 performs the vortex-like circular motion. By directing a portion of the water flow from the first space 112 into the flow guiding passage 23, it increases the volume of water spraying outwardly through the flow guiding passage 23 in a path approximating a spiral shape.

Figure 11:
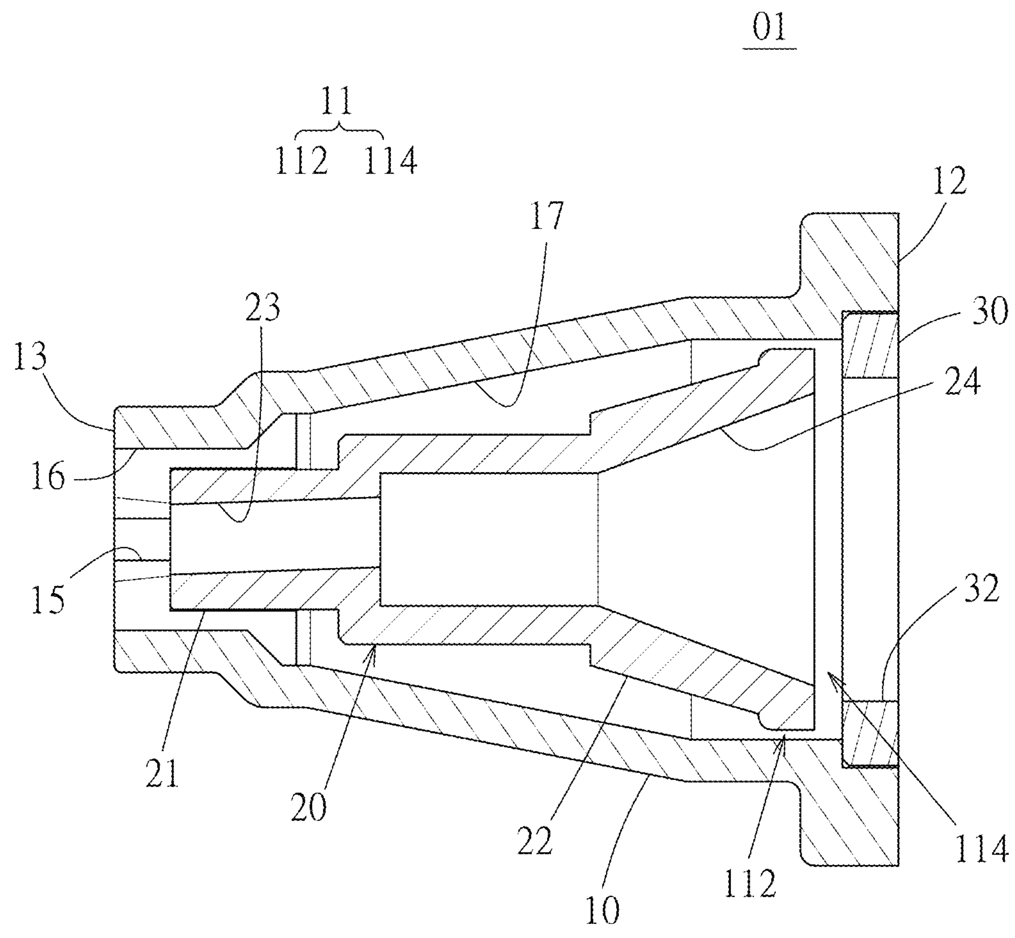
FIG. 11 is an axial sectional view of the third embodiment of the rotary sprinkler head of the present invention.

As shown in FIG. 11, the third embodiment of the rotary sprinkler head 01 differs from the first embodiment mainly in that the inner diameter of the water inlet port 32 is greater than the inner diameter of the flow converging passage 24 on the side closer to the water inlet port 32.

Figure 12:
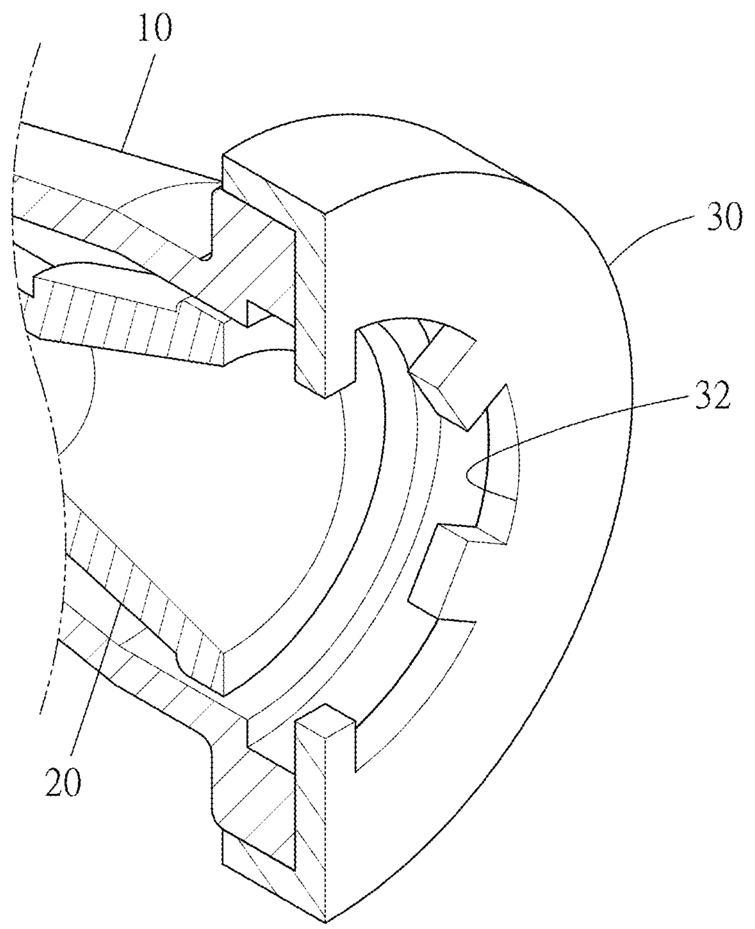
FIG. 12 is a partial perspective sectional view of the fourth embodiment of the rotary sprinkler head of the present invention.

As shown in FIG. 12, the fourth embodiment of the rotary sprinkler head 01 differs from the first embodiment mainly in that the limiting member 30 can be selected to fit over the main body 10.

The invention claimed is:

1. A rotary sprinkler head comprising:

a main body having a shell shape, said main body having an interior that defines a chamber therein, said main body having a water inlet end and a water outlet end at an axially opposite end, the chamber having a vertical front axis line that extends from the water inlet end to the water outlet end, the chamber having an annular first space and a second space, the annular first space extending so as to connect with the second space, said main body having a plurality of positioning stops in spaced relation, the plurality of positioning stops being connected to the water outlet end, a water outlet passage extending through a side of each positioning stop of the plurality of positioning stops that faces a direction of a virtual first axis line, wherein one end of the water outlet passage is connected the chamber, another end of the water outlet passage extending to the water outlet end, wherein multiple discharge channels are moved between adjacent positioning stops of the plurality of positioning stops, each discharge channel of the multiple discharge channels connected the water outlet passage and the annular first space, each discharge channel of the plurality of discharge channels extending to the water outlet end, wherein said main body has a conical surface annularly surrounding the chamber, the virtual first axis line passing through a center circle of the conical surface, wherein a diameter of the conical surface decreases along the virtual first axis line from the water inlet end toward the water outlet end;

a rotating body received in the chamber of said main body, said rotating body having an abutting segment and a convergent segment, one end of the abutting segment abutting each positioning stop of the plurality of positioning stops, the convergent segment being adjacent to an end of said rotating body remote from the abutting segment, wherein a radial outer periphery of the convergent segment is conical such that an outer diameter thereof increases from an end of the convergent segment adjacent to the abutting segment toward an opposite end thereof, the convergent segment and the conical surface being radially opposite to each other, the abutting segment having a flow guiding passage extending therethrough so as to connect with the water outlet passage, wherein a virtual second axis line is defined passing through a radial center of the flow guiding passage, the virtual second axis line obliquely intersecting the virtual first axis line, wherein a conical flow converging passage extends through an interior of the convergent segment so as to connect the flow guiding passage and the second space, wherein an inner diameter of the flow converging passage increases from an end adjacent the flow guiding passage toward an opposite end of the flow converging passage; and a limiting member positioned at the water inlet end, the second space located between said rotating body and said limiting member, a water inlet port extending through said limiting member so as to allow water to enter the second space through the water inlet part and then to flow through the annular first space and the flow guiding passage and to cause said rotating body to rotate in order to create a circular motion of a vortex shape with the virtual first axis line at a center thereof, wherein said main body has multiple surrounding blocks annularly surrounding a radial outer part of the abutting segment, each discharge channel of the plurality of discharge channels extending between a pair of adjacent surrounding blocks of the multiple surround blocks, the annular first space extending between each surrounding blocks of the multiple surrounding blocks and the abutting segment so as to connect to each discharge channel of the plurality of discharge channels.

2. The rotary sprinkler head of claim 1, wherein an angle of between 1° and 6° is formed between the virtual second axis line and the virtual first axis line.

3. The rotary sprinkler head of claim 1, wherein said rotary body laterally forms a connecting passage connecting the first space and the flow guiding passage.

4. The rotary sprinkler head of claim 1, wherein a cone angle of the radially outer periphery of the convergent segment is greater than a cone angle of the conical surface, a cone angle of the flow converging passage being greater than the cone angle of the conical surface.

5. The rotary sprinkler head of claim 1, wherein each surrounding block of the multiple surrounding blocks is connected to a side of each positioning stop facing the chamber.

6. The rotary sprinkler head of claim 1, wherein an inner diameter of the water inlet port is less than an inner diameter of the flow converging passage on a side adjacent to the water inlet port.

7. A spraying device having the rotary sprinkler head of claim 1, wherein the rotary sprinkler head is positioned in said main body, the interior of said main body defining a flow path, one end of the flow path being connected to a water supply pipe and another end of the flow path being connected to the water inlet part.

* * * * *